W. SCHULZ.
FLEXIBLE METALLIC HOSE.
APPLICATION FILED JUNE 30, 1908.

931,091. Patented Aug. 17, 1909.

Witnesses
Inventor
Wilhelm Schulz.
Attorney

UNITED STATES PATENT OFFICE.

WILHELM SCHULZ, OF HOUSTON, TEXAS.

FLEXIBLE METALLIC HOSE.

No. 931,091.      Specification of Letters Patent.      Patented Aug. 17, 1909.

Application filed June 30, 1908. Serial No. 441,150.

*To all whom it may concern:*

Be it known that I, WILHELM SCHULZ, citizen of the United States, residing at No. 1103 Crockett street, Houston, in the county of Harris and State of Texas, have invented certain new and useful Improvements in Flexible Metallic Hose, of which the following is a specification.

My invention relates to new and useful improvements in flexible metal hose.

The object of my invention is to provide a hose involving certain improvements on the device set forth in the Letters Patent issued to me June 11, 1907, Number 856,427.

Among the novel features are the provision of comparatively smooth joints or connections and the obviation of all external standards, levers and the like.

Finally the object of the invention is to provide a device of the character described that will be strong, durable and efficient, and simple and comparatively inexpensive to produce, also one in which the several parts will not be liable to get out of working order.

Figure 1:
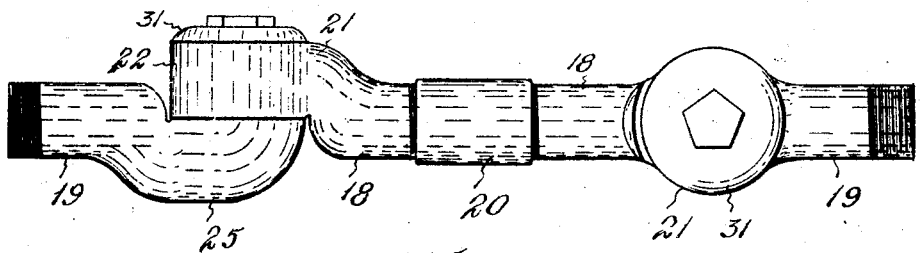
Figure 2:
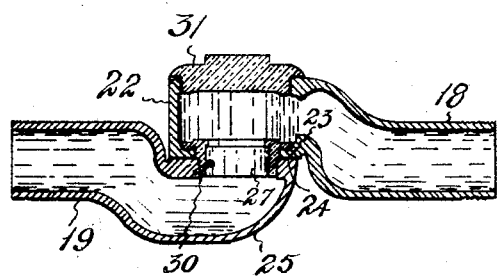
Figure 5:
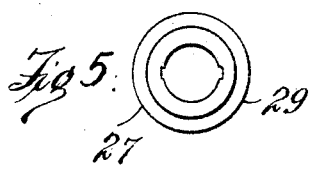
Figure 3:
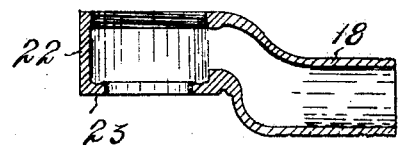
Figure 6:
Figure 4:
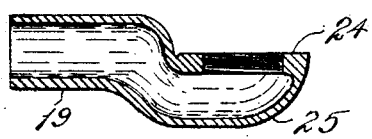

With the above and other objects in view, the invention has relation to certain novel features of construction and operation, an example of which is described in the specification and illustrated in the accompanying drawings, wherein:

Figure 1 is a side elevation of a modified form of hose, Fig. 2 is a longitudinal sectional view through one of the sections of the same, Fig. 3 is a longitudinal section of one of the sections, Fig. 4 is a similar view of the corresponding section, Fig. 5 is a plan view of the coupling sleeve, and Fig. 6 is a sectional view of the same.

In the drawings the numerals 18 and 19 designate a plurality of members or sections. These sections are connected by thimbles 20 and suitable joints or couplings 21, some of which joints operate at right angles to the others. The sections being formed of metal, it is obvious that a flexible hose movable in various directions is provided and it is further to be noted that any desired number of sections and joints may be used. In view of the fact that the joints are all of substantially the same construction, a description of one will suffice for the rest.

Section 18 is formed with a cylindrical coupling member 22 having a round and grooved seat 23 adapted to contact with the ground seat 24 of a coupling member 25 formed on the end of the section 19. A coupling sleeve 27 is passed snugly through the seat 23 and has its lower end 28 reduced and screw threaded so as to be driven in the seat 24. This sleeve has a rounded and ground flange 29 engaging in the grooved portion of the seat 23 and holding the members together, thus preventing leaking and permitting the sections to swing. For holding the sleeve against rotation a set-screw 30 is threaded through the sleeve into the seat 24 as is shown in Fig. 2, said screw lying at an angle and extending upwardly within the sleeve. The upper end of the member 22 is closed by a cap nut 31 threaded therein, upon the removal of which access may be had to the coupling sleeve and parts.

It will be noted that the joints are disposed at right angles permitting movement in various directions and further that the sections 18 may be connected by the thimbles 20 as well as the sections 19 and the hose connected as hereinbefore stated.

A metal hose constructed as herein set forth will not only be compact and practical but less liable to injury and disconnection by reason of the absence of the standards and levers and other projections, beside being of a more substantial and permanent formation.

What I claim, is:

In a flexible pipe joint, the combination with two fluid conducting coupling members having flat contacting faces, of a flange carried by one of said coupling members, the inner face of said flange having an annular groove formed therein, a coupling sleeve threaded into the other of said coupling members and projecting into the first coupling member, said sleeve being formed with an outwardly projecting flange having a bead formed upon its under face, said bead conforming to the shape of and lying within the groove of the flange of the first named coupling member, and a locking screw which pierces the wall of said sleeve and enters the second coupling member to thereby bind said sleeve against movement with relation to said coupling member, the outwardly projecting flange of the coupling sleeve extending from wall to wall of the first named coupling member and said screw lying at an angle and extending upwardly within the sleeve, and a removable cap threaded within the first named coupling member above said sleeve.

In testimony whereof I have signed my name to this specification in the presence of two subscribing witnesses.

WILHELM SCHULZ.

Witnesses:
WM. A. CATHEY,
JACK A. SCHLIN.